April 14, 1925.  1,533,641

S. I. FEKETE ET AL

TRANSMISSION FOR AUTOMOBILES

Filed Aug. 2, 1923

INVENTORS:
Stephen I. Fekete and
Stuart G. Baits
by Macleod, Calhan, Copeland & Dike
Attys.

Patented Apr. 14, 1925.

1,533,641

UNITED STATES PATENT OFFICE.

STEPHEN I. FEKETE AND STUART G. BAITS, OF DETROIT, MICHIGAN, ASSIGNORS TO HUDSON MOTOR CAR COMPANY, OF DETROIT, MICHIGAN, A CORPORATION OF MICHIGAN.

TRANSMISSION FOR AUTOMOBILES.

Application filed August 2, 1923. Serial No. 655,261.

*To all whom it may concern:*

Be it known that we, STEPHEN I. FEKETE and STUART G. BAITS, citizens of the United States, residing at Detroit, county of Wayne, State of Michigan, have invented a certain new and useful Improvement in Transmissions for Automobiles, of which the following is a specification, reference being had therein to the accompanying drawings.

The present invention relates to sliding gear transmissions for change speed gearings for use in automobiles and the like. The particular object of the invention is to provide a device which can be manufactured at less expense and will give better satisfaction in use, owing to the improved construction of the parts and more perfect lubrication. Heretofore, in sliding gear transmissions difficulty has been experienced in manufacturing the gears on the countershaft and in providing suitable lubrication for them and for the reverse pinion. These difficulties have made it necessary to resort to complicated structures involving additional expense of manufacture, and notwithstanding there has frequently been a failure of lubrication and consequent injury to the parts. The transmission gearing embodying the present invention not only provides more satisfactory lubrication but also can be manufactured at less expense than transmissions which prove less satisfactory in actual use.

The invention will be fully understood from the following description when taken in connection with the accompanying drawings, and the novel features thereof will be pointed out and clearly defined in the claims at the close of this specification.

Figure 2:
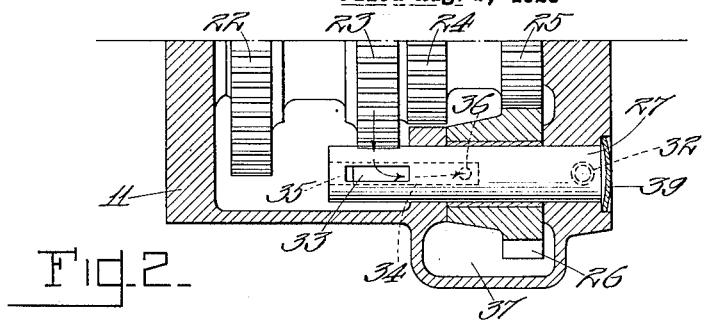
Fig. 2 is a section on line 2—2, Fig. 3.
Figure 1:
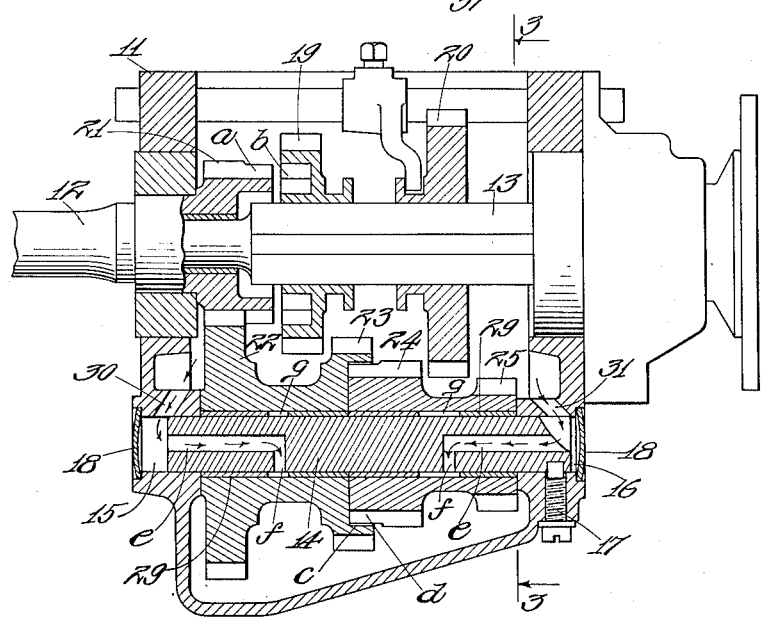
Fig. 1 is a vertical section of a transmission embodying our invention.
Figure 3:
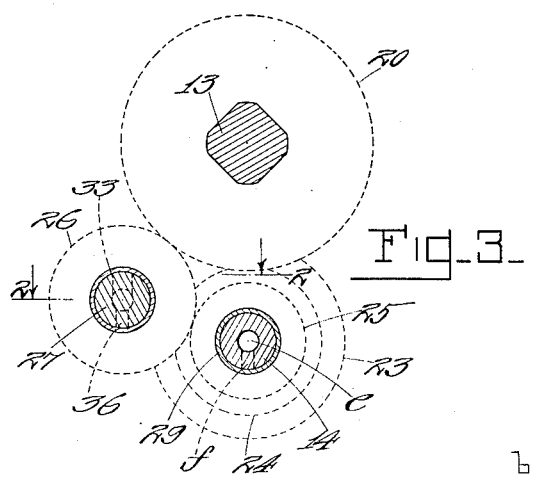
Fig. 3 is a section on line 3—3, Fig. 1, the non-essential parts being omitted.
Figure 4:
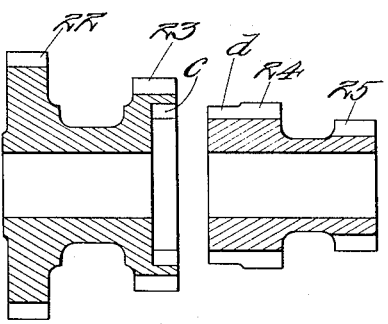
Fig. 4 is a detail of the pinions on the countershaft.

Referring now to the drawing, at 11 is shown the casing, at 12 the driving shaft, and at 13 the driven shaft of the transmission embodying the invention. It will be understood that the driven shaft 13 is splined or square, and of ordinary construction, and that the sliding gears are moved lengthwise thereon. The proximate ends of the driving shaft and driven shaft are not secured together, but during the direct drive one is driven from the other by a dog clutch connection in the manner common in sliding gear transmissions. The countershaft is designated 14 and is mounted in holes 15 and 16 in the casing 11, being fixed in place by a set screw 17. The outer ends of the holes 15 and 16 are closed by Welch plugs 18. On the driven shaft 13 are two sliding gears 19 and 20. On the rear end of the driving shaft is a fixed gear 21. The proximate faces of the gears 19 and 21 are provided with interlocking parts $a$, $b$ forming a so-called dog clutch so that the two gears may be locked together, thereby causing the driving and driven shafts to rotate together for the direct drive. On the countershaft 14 are four gears, 22, 23, 24 and 25. Gear 22 is constantly in mesh with the gear 21, while the gears 23 and 24 mesh respectively with the gears 19 and 20 for the first (low) and second (intermediate) speeds. Gear 25 is the reverse gear and is constantly in mesh with a pinion 26 on the stud 27. The pinion 26 in turn meshes with the gear 20 to reverse the driven shaft.

The four gears 22, 23, 24 and 25 located on the countershaft 14 are made in two pairs, the gears 22 and 23 being integral and the gears 24 and 25 being integral.

The two pairs of gears are provided with an interlocking connection $c$ and $d$ on their proximate faces, so that when put in place on the countershaft they are interlocked with each other and turn as if they were all made in one piece, as has heretofore been customary. Making the gears in two pairs, interlocked as described, greatly reduces the expense of manufacture because the small member containing the gears 24 and 25 can be made from bar stock, and both members are of such size and shape that they can be heat treated without warping. This does away with the loss due to parts warped during heat treating and with the expense of regrinding gears which are slightly warped. Furthermore, the teeth on the gears can be cut more rapidly and satisfactorily than is possible if all four gears are formed in one member, since there is space on each side of each set of gear teeth into which the cutting tool can run, and there are no corners or shoulders which require extreme nicety of adjustment of the gear cutting mechanism.

Between the countershaft and gears are placed four bushings 29 and the countershaft is bored longitudinally and provided with an axial passage e at each end. This axial passage intercepts a radial passage f which psses downwardly and out through the peripheral surface of the bearing and through the space g between adjacent bushings 29. In the casing and leading to the spaces 15 and 16 at the ends of the countershaft are passages 30 and 31 which permit oil from the interior of the casing to pass downward and enter the axial passage e. This construction results in a circulation of the oil, since the rotation of the two gear members on the countershaft tends to carry the oil away from the end of the radial passage f, and this causes other oil to flow down from the passage 30 into the space 15, and then along the axial passage e to replace the oil which has been carried away from the end of the radial passage f. This circulation is automatic and provides constant and efficient lubrication for the bearings of the gears.

The reverse pinion 26 (see Figure 2) is lubricated in a similar manner. The stud 27 on which the reverse pinion 26 revolves is held in place in the casing by a set screw 32 similar to the set screw 17 for countershaft 14. The stud is provided with a radial slot 33 and is drilled axially to provide a passage 34, the outer end of which is closed by a cork plug 35. At the inner end of the axial passage 34 there is a downwardly extending radial passage 36 which emerges from the peripheral surface of the stud inside of the reverse pinion 26. Oil from the gear 23 is thrown into the slot 33 and passes downward into the axial passage 34 along this passage, and then down through the radial passage 36 to the bottom of the bearings. Any oil which works out from the bearing is received in the space 37 in the casing 11, and therefore is in a position to be re-circulated as required. The end of the hole 38 in which the stud 27 is secured to the casing is closed by a Welch plug 39 and therefore no leakage of oil is possible.

What we claim is:

1. In a transmission gearing, a casing, a countershaft mounted in said casing in holes, the ends of which are closed, gears rotatable on said countershaft, said countershaft being provided with an oil passage leading from the closed end of the hole in the casing and emerging through a peripheral surface under said gears.

2. In a transmission gearing, a casing, a countershaft mounted in said casing in holes the ends of which are closed, there being a passage leading through a portion of said casing downward to connect with one of said holes, gears rotatable on said countershaft, said countershaft being provided with an oil passage leading from the closed end in the hole in the casing and emerging downwardly through a peripheral surface of the countershaft.

3. In a transmission gearing, a casing, a countershaft mounted in said casing in holes the ends of which are closed, passages leading through said casing downward to connect with said holes, gears rotatable on said countershaft, said countershaft being provided with oil passages leading from the closed ends of the holes in the casing and emerging downwardly through the peripheral surfaces of the countershaft.

4. In a transmission gearing for automobiles, a fixed stud, a gear rotatably mounted on said stud, said stud being located adjacent other gears in the transmission, a longitudinal oil passage in said stud one end emerging on the upper side thereof and the other end emerging through a peripheral surface of said stud under said gear, the open end of said oil passage being adjacent another gear so that oil from said gear will be thrown into said open end and thence pass through said longitudinal oil passage and emerge at the bearing surface.

In testimony whereof we affix our signatures.

STEPHEN I. FEKETE.
STUART G. BAITS.